Inventor:
Otto Gottfried Wellton
by George Bayard Jones
Attorney.

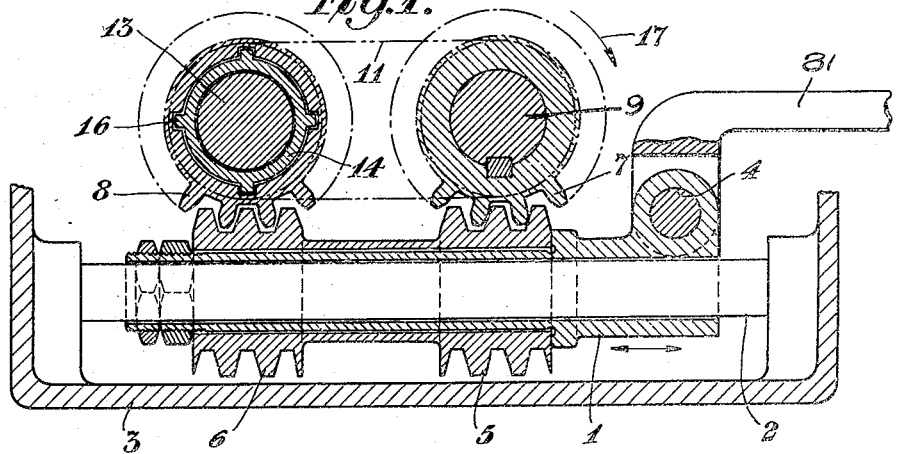
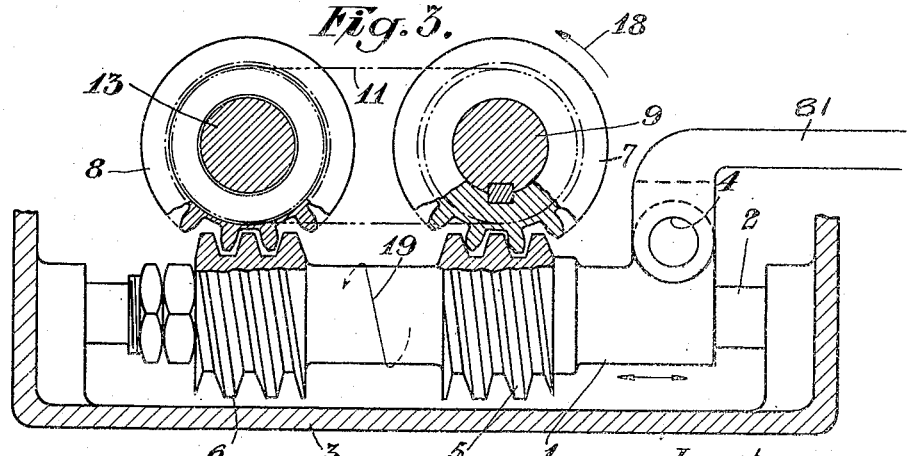

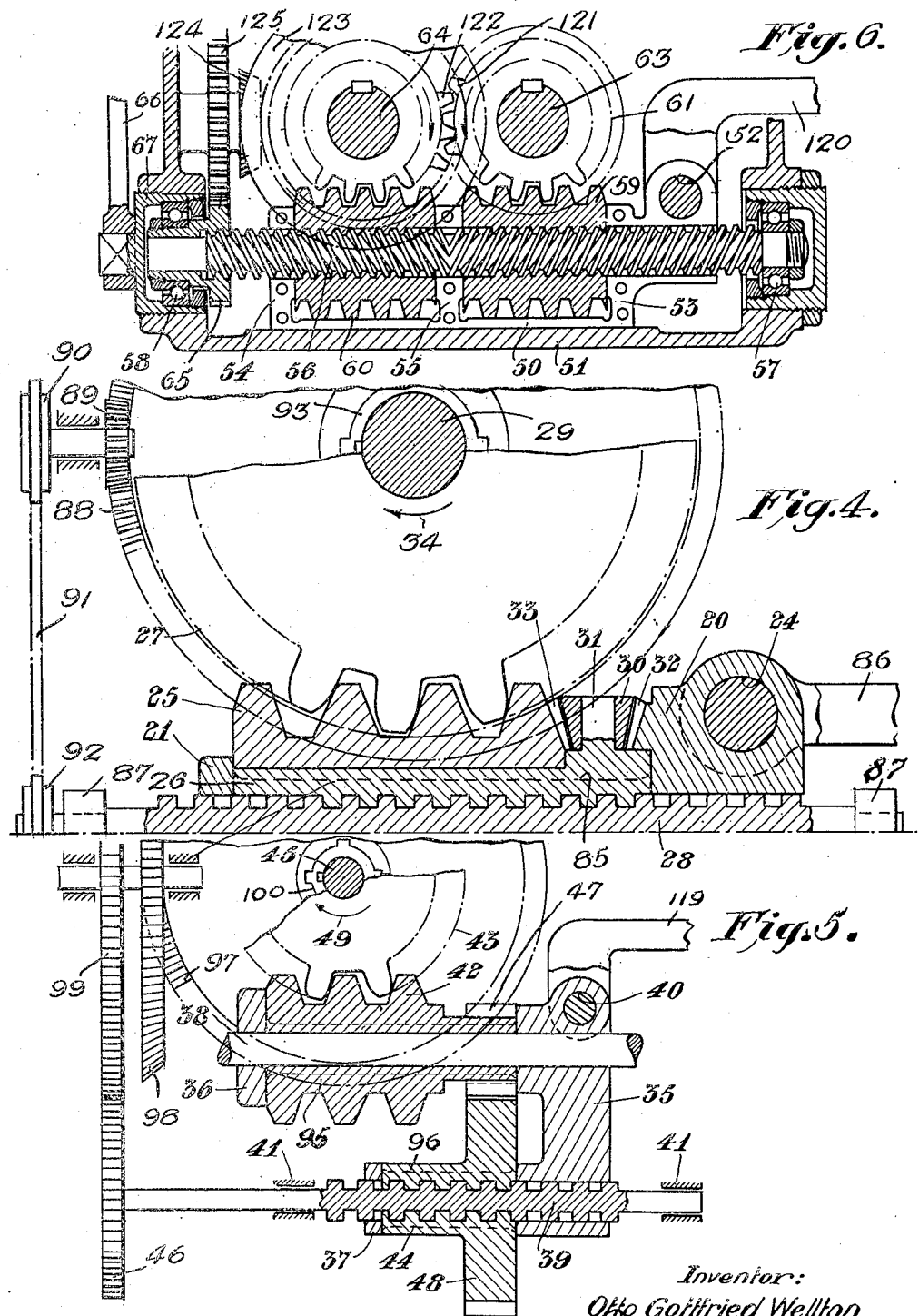

Patented June 30, 1931

1,812,460

UNITED STATES PATENT OFFICE

OTTO GOTTFRIED WELLTON, OF TROLLHATTAN, SWEDEN

DEVICE FOR TRANSMITTING MOTION FROM A RECTILINEARLY RECIPROCATING MEMBER TO A ROTATABLE MEMBER

Application filed February 2, 1927, Serial No. 165,254, and in Sweden February 18, 1926.

The present invention relates to a device for transmitting motion from a rectilinearly reciprocating member to a rotatable member in such manner that the rotatable member is entrained upon movement of the reciprocating member in the one direction, but not upon movement of the same in the opposite direction. The present device is intended to replace the ratchet feeding devices heretofore employed for this purpose, and the invention has for its object to remove the difficulties inherent in such prior devices, viz. that a quite considerable lost motion often arises between the two members when the reciprocating member changes its direction of movement, and that during operation said members produce a clicking sound which in certain cases may have a very disturbing effect. The invention consists principally in that two screw gearings are interposed between the reciprocating member and the rotatable member, one of said gearings being self-stopping and the other not being self-stopping, in such manner that upon movement of the reciprocating member in the one direction the self-stopping screw gearing acts as an ordinary toothed or spur gearing and entrains the rotatable member, the other screw gearing which is not self-stopping, serving upon movement of the reciprocating member in the opposite direction to rotate the screw of the self-stopping screw gearing back to a new position of engagement with the screw wheel of such gearing. By this arrangement a motion transmitting device is obtained which operates without noise and with practically no lost motion.

In this specification the term "screw gearing" should be interpreted as including all types of such gearing consisting of two cooperating screws, whether convex or concave. Both of said screws may thus be provided with exterior threads, and one of the same may, for instance, be a worm wheel, or one of the screws may have interior threads, and be, for instance, a nut.

Figure 2:
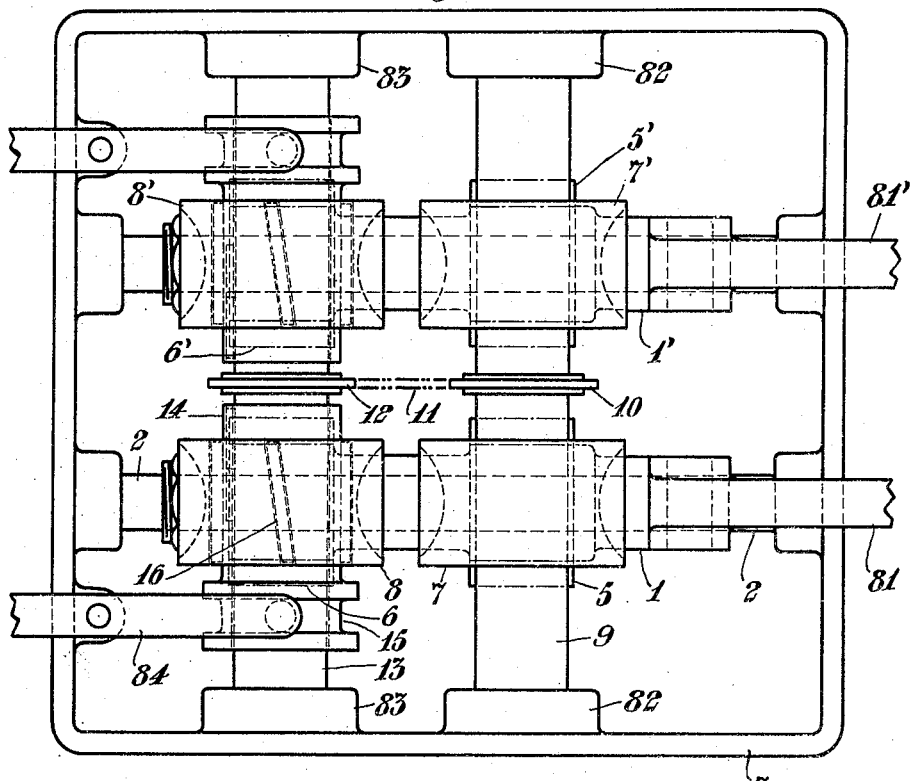
Figure 7:
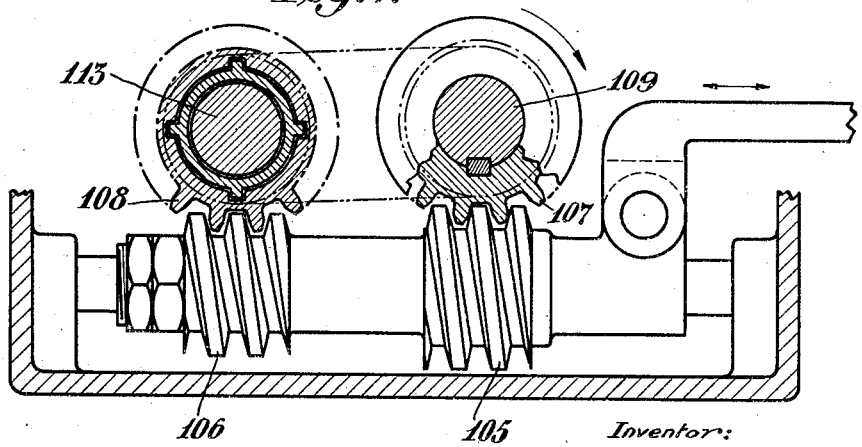

In the accompanying drawings a few different embodiments of the invention are illustrated by way of example. Fig. 1 shows a motion transmitting device according to the invention in longitudinal section, and Fig. 2 shows the same viewed from above. Fig. 3 shows the same device as in Fig. 1, but with the various parts in other mutual positions. Fig. 4 shows a motion transmitting device according to the invention having two screw gearings the screws of which are connected to one another by means of a gearing, and Fig. 5 shows a modified constructional form of this device. Fig. 6 shows a double motion transmitting device according to the invention. Fig. 7 shows a modified construction of the device illustrated in Figs. 1 and 2.

In the construction illustrated in Figs. 1 to 3, 1 denotes the rectilinearly reciprocating member which in this case has the shape of a sleeve which is slidable but not rotatable on a rod 2 the ends of which are secured in a frame 3, and which sleeve may be put in a reciprocating motion by means of a link rod 81, 81, which rod engages an eye 4 on said sleeve. Rotatable but not slidable on said sleeve 1 are two worms 5 and 6 which are rigidly secured to one another, and each of which meshes with a worm wheel 7 and 8, respectively. The first-named of said worm wheels is keyed to a shaft 9 which is journalled in fixed bearings 82, and which in this case is assumed to be the rotatable member to be rotated upon movement of the sleeve 1 in the one direction but not upon movement of said sleeve in the opposite direction. To the shaft 9 a chain sprocket wheel 10 is also secured which is connected by means of a chain 11 with a chain sprocket wheel 12 of the same shape mounted on a shaft 13 parallel to the shaft 9 and likewise journalled in fixed bearings 83 and on which shaft 13 the worm wheel 8 is mounted, so that said two shafts 9 and 13 are always caused to rotate in the same direction and with the same speed. The worm wheel 8, however, is not secured to the shaft 13 but is mounted on a connecting sleeve 14 slidable but not rotatable on the shaft 13 which may be slid to and fro in the longitudinal direction of the shaft 13, for instance by means of a fork 84, which engages a groove 15 in the sleeve. The connecting sleeve is provided on its outside with a number of oblique—helical—ridges 16 which engage corresponding grooves in the worm wheel 8 so that said wheel, upon sliding of the sleeve 14 will be slightly rotated in the one direction or the other relatively to the shaft 13 and thus also relatively to the shaft 9 and the worm wheel 7.

As will be evident from the above description and from the drawings there are interposed between the rectilinearly reciprocating member 1 and the rotatable member 9 which is to be rotated upon movement of the member 1 in the one direction, but not upon movement of the same in the opposite direction, two worm gearings 5, 7 and 6, 8. According to the invention the first-named one 5, 7 of these two worm gearings is self-stopping, while the other 6, 8 is not self-stopping. In the present instance where both worms 5 and 6 and also both worm wheels 7 and 8 have the same size and lead, the said difference may be attained by making the parts of the gearings of different materials. For instance, the worm 5 and the worm wheel 7 may both be made of steel, while in the other gearing the worm 6 is made of steel but the worm wheel 8 is made of bronze. In this manner a considerably smaller coefficient of friction is obtained between the parts 6 and 8 than between the parts 5 and 7, and by suitable selection of the lead in relation to the said coefficients of friction it is therefore possible to attain that the worm gearing 5, 7 becomes self-stopping, but the gearing 6, 8 not self-stopping.

The described device operates in the following manner: In the position of the various parts shown in Fig. 1 the worm wheel 8 is adjusted—by suitable adjustment of the connecting sleeve 14—in relation to the worm wheel 7 in such manner that, when the teeth of the worm wheel 8 occupying position of engagement mesh loosely with the threads of the screw 6, that is to say, without contacting under pressure on either side, the teeth of the worm wheel 7 occupying position of engagement bear at the right-hand side of Fig. 1 with a certain pressure against the corresponding threads of the worm 5, as shown at exaggerated scale in Fig. 1 for the sake of clearness. Now, if the sleeve 1 is moved, for instance, towards the left in Fig. 1, the worm gearing 5, 7 which is self-stopping in the manner above described, will operate as an ordinary toothed gearing, so that the worm wheel 7 and the shaft 9 are rotated in the direction of the arrow 17 in Fig. 1. Owing to the chain transmission 10, 11, 12 the worm wheel 8 will also be rotated during such rotation, and the teeth of said wheel will therefore retain their loose mesh with the threads of the screw 6. The shaft 9 may be assumed to be prevented from rotating in the direction opposite to the arrow 17 in Fig. 1 by any suitable means, for instance as illustrated in Fig. 2, by a second set of worm gearings 5', 7' and 6', 8' similar to the gearings 5, 7 and 6, 8 above described, and interposed between the shafts 9, 13 and a reciprocating member 1' similar to the member 1, and which is reciprocated by the link rod 81' in such manner that when one of said reciprocating members 1 or 1' performs a forward stroke, the other performs a back stroke. When afterwards the sleeve 1 reverses its movement and begins to move towards the right in Fig. 1, the teeth of the worm wheel 8 then in mesh come to bear with their left-hand surfaces against corresponding threads of the worm 6. Since also the worm wheel 8 is prevented by the chain 11 from rotating in the counter-clockwise direction in Fig. 1, however, and since on the other hand the worm gearing 6, 8 is not self-stopping, upon movement of the sleeve 1 towards the right in Fig. 1 the said engagement between the now stationary worm wheel 8 and the worm 6 which is rotatable on the sleeve 1, will result in the two worms 6 and 5 being caused to rotate on the sleeve 1 in such direction, that the worm 5 is screwed back to a new position of engagement with the worm wheel 7, so that when the sleeve 1 again reaches its position farthest to the right, the various parts again occupy the positions illustrated in Fig. 1, with the exception that the two worm wheels 7 and 8 have been rotated through a certain angle which is proportional to the stroke of the sleeve 1. The course described may therefore be repeated when next the sleeve 1 begins to move towards the left. With the adjustment of the two worm wheels 7 and 8 relatively to each other as shown in Fig. 1, the shaft 9 will thus always be rotated in the direction indicated by the arrow 17.

If, on the other hand, it is desired to cause the shaft 9 to rotate in the opposite direction, that is to say, to be rotated when the sleeve 1 is moved towards the right, the worm wheel 8 is adjusted, by means of the connecting sleeve 14, relatively to the worm wheel 7 in the manner illustrated in Fig. 3, that is to say, in such manner that when the teeth of the worm wheel 8 occupying positions of engagement mesh loosely with the threads of the worm 6 without bearing with pressure on either side, the teeth of the worm wheel 7 occupying positions of engagement bear at the left-hand side in Fig. 3 with a certain pressure against corresponding threads on the worm 5. Now, if the sleeve 1 is moved towards the right in Fig. 3, the self-stopping worm gearing 5, 7 will therefore operate as an ordinary toothed gearing, so that the worm wheel 7 and the shaft 9 are rotated in the direction of the arrow 18 in Fig. 3, that is to say, in the opposite direction to that in Fig. 1, and in such rotation the worm wheel 8 is also entrained, so that the teeth of said worm wheel retain their loose mesh with the threads of the worm 6. When afterwards the sleeve 1 reverses its movement and begins to move towards the left in Fig. 3, the teeth of the worm wheel 8 then in mesh will come to bear with their right-hand faces in Fig. 3 against corresponding threads of the worm 6, and since the worm wheel 8 is prevented by the chain 11 from rotating in the clockwise direction, and since the worm gearing 6, 8 is not self-stopping, upon movement of the sleeve 1 towards the left in Fig. 3 the two worms 6 and 5 will be caused to rotate on the sleeve 1 in the direction indicated by the arrow 19, so that in this manner the worm 5 is screwed back to a new position of engagement with the worm wheel 7, and upon the next movement of the sleeve 1 towards the right it can again rotate the worm wheel 7 in the direction of the arrow 18. With the adjustment of the two worm wheels 7 and 8 relatively to one another as shown in Fig. 3, the shaft 9 will thus always be rotated in the direction indicated by the arrow 18.

In the construction according to Figs. 1 to 3 incl. as above described, in which the two worms 5 and 6 have the same size and lead, it has been assumed that the difference in respect of self-stopping action necessary for the desired operation is brought about solely by making the two worm wheels 7 and 8 of different materials. In order to attain a still greater difference in respect of self-stopping action between the two worm gearings, and thus also a greater security of attaining the desired operation, and simultaneously, also a higher efficiency, it may be suitable, however, to give the worm of the non-self-stopping gearing a larger angle of helix than the worm of the self-stopping gearing. Figure 7 illustrates this modification of the device shown in Figs. 1 and 2. Since the lead or the pitch must be the same for both worms in order that the correct engagement shall be retained between the worm wheel 108 and the worm 106 when the gearing 105, 107 operates as a toothed gearing and rotates the shaft 109, it is necessary simultaneously to make the worm 106 of a less diameter than the worm 105, and thus also to lower the shaft 113, that is to say, to place said shaft correspondingly closer to the common axis of the worms 106 and 105 than the shaft 109, which does not of course present any difficulties. By such modification of the device the required difference in respect of self-stopping action may be attained even if both worm wheels 107 and 108 be made of the same material, but it is of course more advantageous still to retain the above described construction of the worm wheels of different materials, so that both a less coefficient of friction and a larger angle of helix is obtained of the worm 106 of the non-self-stopping gearing than of the worm of the self-stopping gearing.

In the embodiment above described the two screws 5 and 6 are rigidly secured to one another and will therefore always rotate with the same speed when the member 1 returns without rotating the shaft 9. A great difference in respect of self-stopping action between the two screw gearings and thus also a very reliable operation may be attained, however, by making the screws separate and interposing between the same a gearing in such manner that the screw of the non-self-stopping gearing will rotate with less speed than the screw of the self-stopping gearing. The first-named screw may then also without difficulty be made with a many times larger angle of helix than the latter. Two embodiments of this type are illustrated in Figs. 4 and 5.

In the construction illustrated in Fig. 4, 20, 21 denote the rectilinearly reciprocating member which in this case consists of two rings which are rigidly connected to one another, for instance by means of a pair of arms 85, and which are slidable on a square-threaded screw 28 in such a manner that they may be moved forwards and back in the longitudinal direction of the screw, for instance by means of a link rod 86 engaging the eye 24. The square-threaded screw 28 which in respect of operation corresponds to the worm wheel 8 in Fig. 1, is rotatably but not slidably mounted in suitable bearings 87. Between the rings 20 and 21 there are interposed two screw-threaded sleeves 25 and 26, one outside the other, the outer sleeve 25 being provided with exterior threads by means of which it engages a worm wheel 27 which corresponds to the worm wheel 7 in Fig. 1, and the inner sleeve 26 being provided with interior threads by means of which it engages the threads of the screw 28. The worm wheel 27 is secured to a shaft 29 which forms the rotatable member which is to be rotated upon movement of the rings 20 and 21 in the one direction, but not upon movement of the same in the opposite direction. The shaft 29 is connected by means of some suitable gearing, for instance a bevel gearing 88, 89 and a chain transmission 90, 91, 92, to the screw 28 in such manner that said screw always takes part in the rotation of the shaft 29. Between the sleeves 25 and 26 there is also interposed a gearing which in the instance illustrated consists of one or more bevel gears 30, only one of which is shown in Fig. 4, which are rotatably mounted on journals 31 projecting radially from the sleeve 26, and which mesh with a row of bevel teeth 32 on the non-rotatable ring 20, and also with a row of bevel teeth 33 on the one—right-hand—end of the outer sleeve 25. When the sleeve 26 is rotated around the axis of the screw 28, the bevel gears 30 will thus roll against the row of teeth 32 on the non-rotatable ring 20, and will thereby rotate the outer sleeve 25 with a speed which is twice the rotational speed of the sleeve 26. Also in this case there should be interposed in the above-mentioned gearing between the shaft 29 and the screw 28, for instance between the shaft 29 and the wheel 88 of the bevel gearing, an adjustment device, for instance a slidable connecting sleeve 93 having oblique ridges of a kind similar to that shown in Fig. 1, so that by means of the same it is possible to rotate the screw 28 slightly in relation to the worm wheel 27 for the purpose of changing the direction of rotation of the shaft 29.

As will be understood from the above description, between the rectilinearly reciprocating member 20, 21 and the rotatable member 29 there are also in this case interposed two screw gearings 25, 27 and 26, 28, the first named of which is made self-stopping, according to the invention, whereas the latter is not self-stopping.

In the position of the different parts illustrated in Fig. 4 the screw 28 is adjusted— by the aid of the above-mentioned adjustment device 93 interposed in the gearing between the members 28 and 29—in relation to the worm wheel 27 in such manner that when the threads of the screw 28 occupying positions of engagement mesh loosely with the threads of the screw 26, the teeth of the worm wheel 27 occupying positions of engagement bear at the right-hand side in Fig. 4 with a certain pressure against the corresponding threads of the worm or screw 25. Now, if the rings 20, 21 are moved towards the left in Fig. 4 the self-stopping worm gearing 25, 27 will act as an ordinary toothed gearing, so that the worm wheel 27 and the shaft 29 are rotated in the direction of the arrow 34 in Fig. 4. Owing to the above mentioned gearing the screw 28 is also entrained during such rotation, so that its threads retain their loose mesh with the threads of the screw 26, while the two screws 25 and 26 are moved with the rings 20 and 21 without rotating. When afterwards the rings 20 and 21 reverse their direction of movement and begin to move towards the right in Fig. 4, owing to the non-self-stopping engagement between the screw 26 and the screw 28 said screw 26 is put in rotation in such direction and with such rate of speed that it can move with the rings 20, 21. Such rotation of the screw 26 is transmitted through the bevel gears 30 to the worm or screw 25 so that said screw is screwed back in the same manner as the worm 5 in Fig. 1, to a new position of engagement with the worm wheel 27, and upon the next movement of the rings 20, 21 towards the left it can again rotate the worm wheel 27 in the direction of the arrow 34. With the adjustment of the two members 27 and 28 relatively to each other as shown in Fig. 4 the shaft 29 will thus always be rotated in the direction indicated by the arrow 34. Again, if it is desired to cause the shaft 29 to rotate in the opposite direction, that is to say, to be rotated upon movement of the rings 20, 21 towards the right in Fig. 4, the screw 28 is adjusted, by means of the adjustment device 93 interposed in the gearing between the members 28 and 29, relatively to the worm wheel 27 in such manner that, at a loose engagement between the screws 28 and 26, the teeth of the worm wheel 27 occupying positions of engagement will instead bear with their left-hand faces in Fig. 4 against corresponding threads of the screw or worm 25 with a certain pressure. The self-stopping worm gearing 25, 27 will then operate as an ordinary toothed gearing and rotate the worm wheel 27 and the shaft 29 in the counter-clockwise direction in Fig. 4 upon movement of the rings 20, 21 towards the right, while upon movement of the rings towards the left the screw or worm 25 is screwed back in the manner above described to a new position of engagement with the then stationary worm wheel 27.

In the construction according to Fig. 4, the gearing between the screws 26 and 25 the former of which is placed inside the latter in order to save space, is such that the self-stopping screw 25 is rotated with a speed which is twice as high as the rotational speed of the screw 26. If desired, however, it is possible to obtain a still greater difference in the speed of rotation between the two screws by locating the non-self-stopping screw outside the self-stopping screw and connecting the same by means of an ordinary cylindrical gearing which in such case may be constructed for any desired gear ratio. An arrangement of this type, representing the most general case, is shown in Fig. 5.

According to Fig. 5 the rectilinearly reciprocating member consists of a cross piece 35 and two rings 36 and 37 rigidly connected with said cross piece—by means of arms 95, 96 or the like. Said cross piece together with the rings is slidable but not rotatable on a fixed bar 38 and on a square-threaded screw 39 parallel with said bar, so that the cross piece may be moved forwards and back in the longitudinal direction of the bar, for instance by means of a link rod 119 engaging the eye 40. The screw 39, which corresponds to the screw 28 in Fig. 4 and to the worm wheel 8 in Fig. 1, is rotatably but not slidably journalled in fixed bearings 41. Between the cross piece 35 and the ring 36 there is interposed a sleeve 42 rotatable and slidable on the bar 38 and screw-threaded on its outside, so that it forms a worm the threads of which engage a worm wheel 43 which corresponds to the worm wheel 27 in Fig. 4, and between the cross piece 35 and the ring 37 a sleeve 44 is mounted on the screw 39, said sleeve being screw-threaded on its inside and engaging by means of such screw-threads the screw-threads of the screw 39. The worm wheel 43 is secured to a shaft 45 which forms the rotatable member which is to be rotated upon movement of the cross piece 35 in the one direction, but not upon movement of the same in the opposite direction. The shaft 45 is connected by means of some suitable gearing, such as a train of gears 97, 98, 99, to a gear 46 secured to the screw 39, so that said screw 39 is always caused to be rotated when the shaft 45 is rotated. In said gearing there shall also in this case be interposed an adjustment device, for instance a slidable sleeve 100 having oblique ridges of a kind similar to that shown in Fig. 1 and inserted between the shaft 45 and the gear 97, by means of which it is possible slightly to rotate the screw 39 relatively to the worm wheel 43 for the purpose of changing the direction of rotation of the shaft 45. Finally, between the sleeves 42 and 44 there is also interposed a gearing which in this case consists of a small gear 47 which is made integral with the sleeve 42 and which meshes with a larger gear 48 which is made integral with the sleeve 44. The ratio between the speeds of rotation of the screws 42 and 44 will thus in this case be dependent upon the ratio between the diameters of the two gears 47 and 48, which latter ratio may in this case be chosen as desired.

The operation of this device is substantially the same as that above described in connection with Fig. 4. Also in the device according to Fig. 5 there are interposed between the reciprocating member 35, 36, 37 and the rotatable member 45 two screw gearings 42, 43 and 44, 39, the former of which is self-stopping but the latter of which is not self-stopping. In the position of the parts illustrated in Fig. 5, the worm wheel 43 is adjusted in relation to the screw 39 in such manner that the self-stopping worm gearing 42, 43 acts as an ordinary toothed gearing and rotates the worm wheel 43 and the shaft 45 in the direction indicated by the arrow 49 when the cross piece 35 is moved towards the left, whereas upon movement of said cross piece towards the right the worm 42 is screwed back by the agency of the screw 44 and the gears 48 and 47 to a new position of engagement with the worm wheel 43, so that upon the next movement of the cross piece 35 towards the left said worm can again rotate the worm wheel 43 in the direction of the arrow 49. Again, if it is desired to cause the shaft 45 to rotate in the opposite direction, the worm wheel 43 is adjusted relatively to the screw 39 in such manner that the teeth of the worm wheel occupying positions of engagement bear with their left-hand faces in Fig. 5 against the corresponding threads of the worm 42 with a certain pressure, so that the self-stopping worm gearing 42, 43 acts as an ordinary toothed gearing and rotates the shaft 45 when the cross piece 35 is moved towards the right in Fig. 5.

Finally, in Fig. 6 a double motion transmitting device is illustrated the construction of which most nearly resembles the one illustrated in Fig. 4, with the difference however, that there is no gearing between the two worms or screws. According to Fig. 6 the rectilinearly reciprocating member consists of a trough-shaped slide 50 the plane lower surface of which is adapted to slide on a plane surface of the frame 51, and which may be reciprocated by means of a link rod 120, engaging the eye 52. A square-threaded screw 56 extends through apertures in the two end walls 53, 54 of the slide and in a partition 55 provided intermediate said end walls, said screw being provided with left-hand threads on the one half of its length and with right-hand threads on the other half, and the ends of said screw being rotatably but not slidably journalled in the frame 51 by means of ball bearings 57 and 58. In the spaces between the two end walls and the partition of the slide sleeves 59 and 60 are mounted on the screw 56, said sleeves being provided with interior as well as exterior threads and engaging by means of such interior threads the corresponding right-hand and left-hand threads of the screw 56, while their exterior threads, which are right-hand threads on the one sleeve and left-hand threads on the other, each engage one worm wheel 61 and 62, respectively. Said worm wheels are secured to two parallel shafts 63 and 64, respectively, which form the rotatable members which are to be rotated upon movement of the slide 50. The two shafts 63 and 64 are interconnected by means of gears 121, 122, in such manner that they are forced to move in opposite directions, as indicated by the arrows shown in Fig. 6. One of said shafts, for instance 64, is further connected by means of some suitable gearing, such as a train of gears 123, 124, 125, with a gear 65 which is formed as a nut screwed on to one end of the screw 56, and which may be screwed more or less on to said screw by turning a lever 66 which actuates a cap 67 screw-threaded into the frame 51 and enclosing the ball bearing 58, and by the turning of which said ball bearing and thus also the gear wheel 65 may be moved slightly towards the right or towards the left in Fig. 6. Said cap 67 forms in this case the adjustment device by means of which it is possible to rotate the screw 56 slightly relatively to the worm wheels 61 and 62 for the purpose of reversing the direction of rotation of the shafts 63 and 64.

Between the reciprocating member 50 and each of the rotatable members 63 and 64 there are thus also in this case interposed two screw gearings, namely between the members 50 and 63 the screw gearings 59, 61 and 59, 56 the former of which is self-stopping but the latter not self-stopping, and between the members 50 and 64 the screw gearings 60, 62 and 60, 56 the former of which is self-stopping but the latter of which is not self-stopping. In the position of the various parts illustrated in Fig. 6 the worm wheel 61 is adjusted relatively to the screw 56 in such manner that when the slide 50 is moved towards the right in Fig. 6, the self-stopping screw gearing 59, 61 acts as an ordinary toothed gearing and rotates the worm wheel 61 and the shaft 63 in the counter-clockwise direction. Owing to the above-mentioned toothed gearing 121, 122 between the shafts 63 and 64 the latter shaft as well as the worm wheel 62 are simultaneously rotated in the clockwise direction, and owing to the gearing 123, 124, 125 between the shaft 64 and the gear 65 and the screw 56 this latter and also the sleeve 60 are rotated in such direction that, in spite of the worm wheel 62 engaging the exterior threads of the sleeve 60, the worm wheel 62 can perform the said clockwise rotation. Upon movement of the slide 50 towards the right the screw 56 and sleeve 60 are thus rotated, whereas the sleeve 59 does not rotate. When afterwards the slide 50 is moved towards the left the self-stopping worm gearing 60, 62 acts as an ordinary toothed gearing and rotates the worm wheel 62 and the shaft 64 in the clockwise direction, that is to say, in the same direction as that in which the shaft 64 was just rotated by the shaft 63. Simultaneously the shaft 63, screw 56, and sleeve 59 are rotated, so that the exterior threads on the latter are turned to a new position of engagement with the worm wheel 61. Upon movement of the slide 50 towards the left the screw 56 and the sleeve 59 are thus rotated, whereas the sleeve 60 does not rotate. On the other hand, if it is desired to cause the shafts 63 and 64 to rotate in the directions opposite to those indicated by the arrows, the screw 56 is adjusted by means of the lever 66 relatively to the worm wheels 61 and 62 in such manner that the self-stopping worm gearing 59, 61 acts as an ordinary toothed gearing and rotates the worm wheel 61 and the shaft 63 in the clockwise direction when the slide 50 is moved towards the left in Fig. 6, whereas the self-stopping worm gearing 60, 62 acts as a toothed gearing and rotates the shaft 64 in the counter-clockwise direction upon movement of the slide 50 towards the right in Fig. 6.

The embodiments above described and illustrated in the drawings are only to be regarded as examples and may obviously be further modified in respect of their details in several different ways without departing from the principle of the invention.

I claim:

1. In a motion transmitting device the combination of a reciprocating member, a rotatable member, a self-stopping screw gearing interposed between said reciprocating member and said rotatable member and acting upon movement of said reciprocating member in the one direction as an ordinary toothed gearing to rotate said rotatable member, said self-stopping screw gearing comprising a screw wheel connected to said rotatable member, and a screw cooperating with said screw wheel and connected to said reciprocating member, a guide guiding said screw to move in a rectilinear path tangential to said screw wheel, and a gearing also interposed between said reciprocating member and said rotatable member and acting upon movement of said reciprocating member in the opposite direction to rotate said screw of said self-stopping screw gearing back to a new position of engagement with said screw wheel of such gearing.

2. In a motion transmitting device the combination of a reciprocating member, a rotatable member, a self-stopping screw gearing interposed between said reciprocating member and said rotatable member and acting upon movement of said reciprocating member in the one direction as an ordinary toothed gearing to rotate said rotatable member, said self-stopping screw gearing comprising a screw wheel connected to said rotatable member, and a screw cooperating with said screw wheel and connected to said reciprocating member, and a non-self-stopping screw gearing also interposed between said reciprocating member and said rotatable member and acting upon movement of said reciprocating member in the opposite direction to rotate said screw of said self-stopping screw gearing back to a new position of engagement with said screw wheel of said self-stopping gearing, said non-self-stopping screw gearing comprising one screw member connected to said rotatable member so as to be rotated by the same, and a second screw member cooperating with said first-named screw member and connected to said screw of said self-stopping screw gearing, and at least one guide guiding said screw of said self-stopping screw gearing to move in a rectilinear path tangential to said screw wheel of said gearing and said second screw member of said non-self-stopping screw gearing to move in a rectilinear path parallel to the path of movement of said screw of said self-stopping screw gearing.

3. In a motion transmitting device the combination of a reciprocating member, a rotatable member, a self-stopping screw gearing interposed between said reciprocating member and said rotatable member and acting upon movement of said reciprocating member in the one direction as an ordinary toothed gearing to rotate said rotatable member, said self-stopping screw gearing comprising a screw wheel connected to said rotatable member, and a screw cooperating with said screw wheel and connected to said reciprocating member, a non-self-stopping screw gearing also interposed between said reciprocating member and said rotatable member and acting upon movement of said reciprocating member in the opposite direction to rotate said screw of said self-stopping screw gearing back to a new position of engagement with said screw wheel of said self-stopping gearing, said non-self-stopping screw gearing comprising one screw member connected to said rotatable member so as to be rotated by the same, and a second screw member cooperating with said first-named screw member and connected to said screw of said self-stopping screw gearing, a guide guiding said reciprocating member to move in a rectilinear path tangential to said screw wheel of said self-stopping screw gearing, said screw of said self-supporting screw gearing and said second screw member of said non-self-stopping screw gearing being rotatably journalled in said reciprocating member with their axes parallel to the path of movement of said reciprocating member.

4. In a motion transmitting device the combination of a reciprocating member, a rotatable member, a self-stopping screw gearing interposed between said reciprocating member and said rotatable member and acting upon movement of said reciprocating member in the one direction as an ordinary toothed gearing to rotate said rotatable member, said self-stopping screw gearing comprising a screw wheel connected to said rotatable member, and a screw cooperating with said screw wheel and connected to said reciprocating member, a non-self-stopping screw gearing also interposed between said reciprocating member and said rotatable member and acting upon movement of said reciprocating member in the opposite direction to rotate said screw of said self-stopping screw gearing back to a new position of engagement with said screw wheel of said self-stopping gearing, said non-self-stopping screw gearing comprising one screw member connected to said rotatable member so as to be rotated by the same, and a second screw member cooperating with said first-named screw member and connected to said screw of said self-stopping screw gearing, a guide guiding said reciprocating member to move in a rectilinear path tangential to said screw wheel of said self-stopping screw gearing, said screw of said self-stopping screw gearing and said second screw member of said non-self-stopping screw gearing being interconnected so as to rotate with a definite relative speed and being rotatably journalled in said reciprocating member on an axis parallel to the path of movement of said reciprocating member.

5. In a motion transmitting device the combination of a reciprocating member, a rotatable member, a self-stopping screw gearing interposed between said reciprocating member and said rotatable member and acting upon movement of said reciprocating member in the one direction as an ordinary toothed gearing to rotate said rotatable member, said self-stopping screw gearing comprising a screw wheel connected to said rotatable member, and a screw cooperating with said screw wheel and connected to said reciprocating member, a non-self-stopping screw gearing also interposed between said reciprocating member and said rotatable member and acting upon movement of said reciprocating member in the opposite direction to rotate said screw of said self-stopping screw gearing back to a new position of engagement with said screw wheel of said self-stopping gearing, said non-self-stopping screw gearing comprising one screw member connected to said rotatable member so as to be rotated by the same, and a second screw member cooperating with said first-named screw member and connected to said screw of said self-stopping screw gearing, at least one guide guiding said screw of said self-stopping screw gearing to move in a rectilinear path tangential to said screw wheel of said gearing and said second screw member of said non-self-stopping screw gearing to move in a rectilinear path parallel to the path of movement of said screw of said self-stopping screw gearing, and an adjustment device interposed between the members of said two screw gearings connected to said rotatable member for rotating said members relatively to each other for the purpose of changing the direction of rotation of said rotatable member.

6. In a motion transmitting device the combination of a reciprocating member, a rotatable member, a self-stopping screw gearing interposed between said reciprocating member and said rotatable member and acting upon movement of said reciprocating member in the one direction as an ordinary toothed gearing to rotate said rotatable member, said self-stopping screw gearing comprising a screw wheel connected to said rotatable member, and a screw cooperating with said screw wheel and connected to said reciprocating member, and a non-self-stopping screw gearing also interposed between said reciprocating member and said rotatable member and acting upon movement of said reciprocating member in the opposite direction to rotate said screw of said self-stopping screw gearing back to a new position of engagement with said screw wheel of said self-stopping gearing, said non-self-stopping screw gearing comprising one screw member connected to said rotatable member so as to be rotated by the same, and a second screw member cooperating with said first-named screw member and connected to said screw of said self-stopping screw gearing, and at least one guide guiding said screw of said self-stopping screw gearing to move in a rectilinear path tangential to said screw wheel of said gearing and said second screw member of said non-self-stopping screw gearing to move in a rectilinear path parallel to the path of movement of said screw of said self-stopping screw gearing, the screw members of the non-self-stopping screw gearing having a larger angle of lead than the members of the self-stopping screw gearing and the second screw member of the non-self-stopping screw gearing having a less diameter than the screw of the self-stopping screw gearing.

7. In a motion transmitting device the combination of a reciprocating member, a rotatable member, a self-stopping screw gearing interposed between said reciprocating member and said rotatable member and acting upon movement of said reciprocating member in the one direction as an ordinary toothed gearing to rotate said rotatable member, said self-stopping screw gearing comprising a screw wheel connected to said rotatable member, and a screw cooperating with said screw wheel and connected to said reciprocating member, a non-self-stopping screw gearing also interposed between said reciprocating member and said rotatable member and acting upon movement of said reciprocating member in the opposite direction to rotate said screw of said self-stopping screw gearing back to a new position of engagement with said screw wheel of said self-stopping gearing, said non-self-stopping screw gearing comprising one screw member connected to said rotatable member so as to be rotated by the same, and a second screw member cooperating with said first-named screw member and connected to said screw of said self-stopping screw gearing, and at least one guide guiding said screw of said self-stopping screw gearing to move in a rectilinear path tangential to said screw wheel of said gearing and said second screw member of said non-self-stopping screw gearing to move in a rectilinear path parallel to the path of movement of said screw of said self-stopping screw gearing, said first-named screw member of said non-self-stopping screw gearing consisting of a screw located transversely to said rotatable member and geared to the same.

8. In a motion transmitting device the combination of a reciprocating member, a rotatable member, a self-stopping screw gearing interposed between said reciprocating member and said rotatable member and acting upon movement of said reciprocating member in the one direction as an ordinary toothed gearing to rotate said rotatable member, said self-stopping screw gearing comprising a screw wheel connected to said rotatable member, and a screw cooperating with said screw wheel and connected to said reciprocating member, a non-self-stopping screw gearing also interposed between said reciprocating member and said rotatable member and acting upon movement of said reciprocating member in the opposite direction to rotate said screw of said self-stopping screw gearing back to a new position of engagement with said screw wheel of said self-stopping gearing, said non-self-stopping screw gearing comprising one screw member connected to said rotatable member so as to be rotated by the same, and a second screw member cooperating with said first-named screw member and connected to said screw of said self-stopping screw gearing, at least one guide guiding said screw of said self-stopping screw gearing to move in a rectilinear path tangential to said screw wheel of said gearing and said second screw member of said non-self-stopping screw gearing to move in a rectilinear path parallel to the path of movement of said screw of said self-stopping screw gearing, said first-named screw member of said non-self-stopping screw gearing consisting of a screw located transversely to said rotatable member and geared to the same, said second screw member of said non-self-stopping screw gearing consisting of interior screw threads on a sleeve threaded onto said screw, and said screw of said self-stopping screw gearing consisting of screw threads on the outside of said sleeve.

9. In a motion transmitting device the combination of a rotatable device comprising two shafts, a gearing connecting said shafts to rotate in opposite directions, a screw geared to said shafts and located transversely to said shafts, said screw having two oppositely directed screw threads, a reciprocating member, a guide guiding said reciprocating member to move in a rectilinear path parallel to the axis of said screw, two sleeves journalled in said reciprocating member, each sleeve having an interior screw thread engaging one of said screw threads on said screw, each sleeve having an exterior screw thread, and one screw wheel secured to each of said shafts and engaging such exterior thread on one of said sleeves.

OTTO GOTTFRIED WELLTON.